Figure 1:
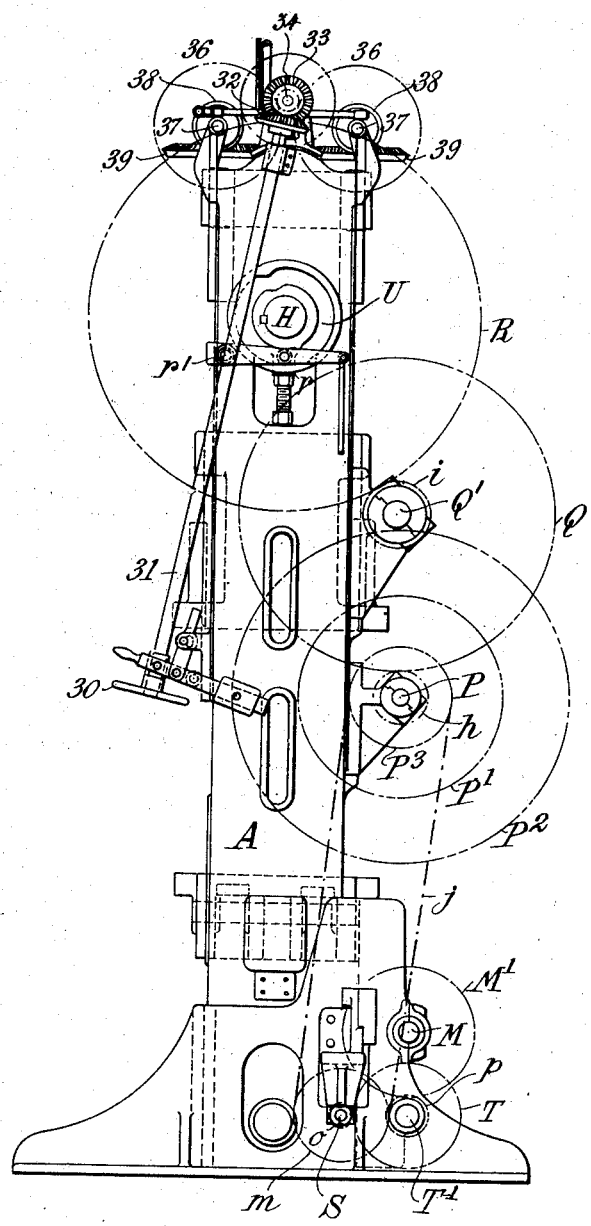

No. 738,459. PATENTED SEPT. 8, 1903.
F. M. LEAVITT.
DRAWING PRESS.
APPLICATION FILED JUNE 16, 1902.
NO MODEL. 9 SHEETS—SHEET 1.

Witnesses
Fred White
Thomas F. Wallace

Inventor
Frank M. Leavitt,
By his Attorneys

No. 738,459. PATENTED SEPT. 8, 1903.
F. M. LEAVITT.
DRAWING PRESS.
APPLICATION FILED JUNE 16, 1902.
NO MODEL.
9 SHEETS—SHEET 2.

Witnesses
Fred White
Thomas T. Wallace

Inventor
Frank M. Leavitt,
By his Attorneys

No. 738,459. PATENTED SEPT. 8, 1903.
F. M. LEAVITT.
DRAWING PRESS.
APPLICATION FILED JUNE 16, 1902.
NO MODEL. 9 SHEETS—SHEET 3.

No. 738,459. PATENTED SEPT. 8, 1903.
F. M. LEAVITT.
DRAWING PRESS.
APPLICATION FILED JUNE 16, 1902.
NO MODEL. 9 SHEETS—SHEET 4.

Witnesses
Fred White
Thomas F. Wallace

Inventor
Frank M. Leavitt,
By his Attorneys

No. 738,459. PATENTED SEPT. 8, 1903.
F. M. LEAVITT.
DRAWING PRESS.
APPLICATION FILED JUNE 16, 1902.
NO MODEL. 9 SHEETS—SHEET 6.
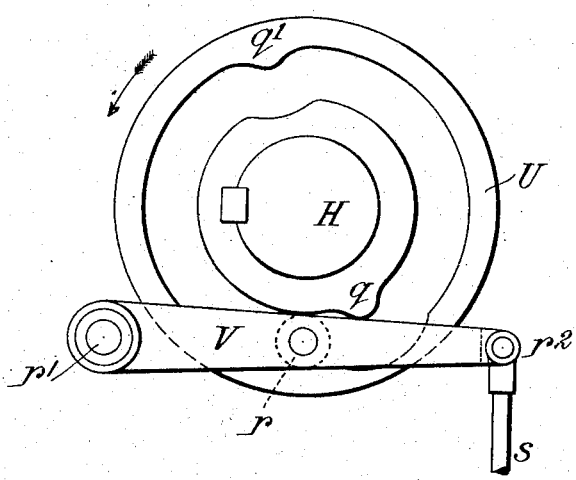
FIG. 6.
FIG. 6.ª
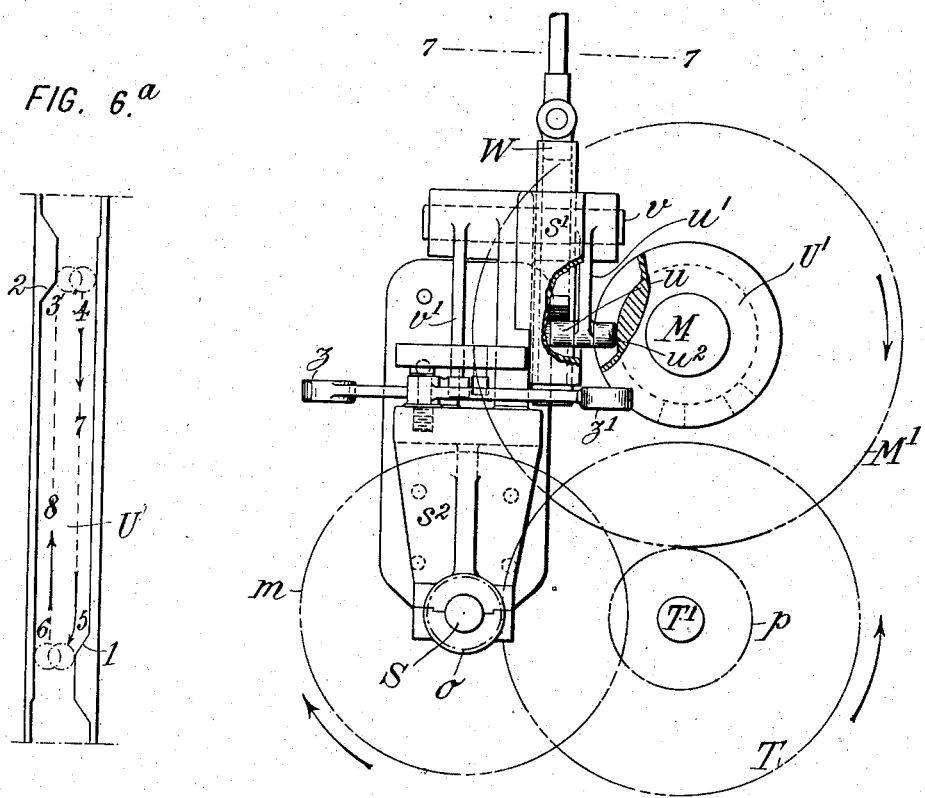
Witnesses
Fred White
Thomas T. Wallad
Inventor
Frank M. Leavitt
By his Attorneys

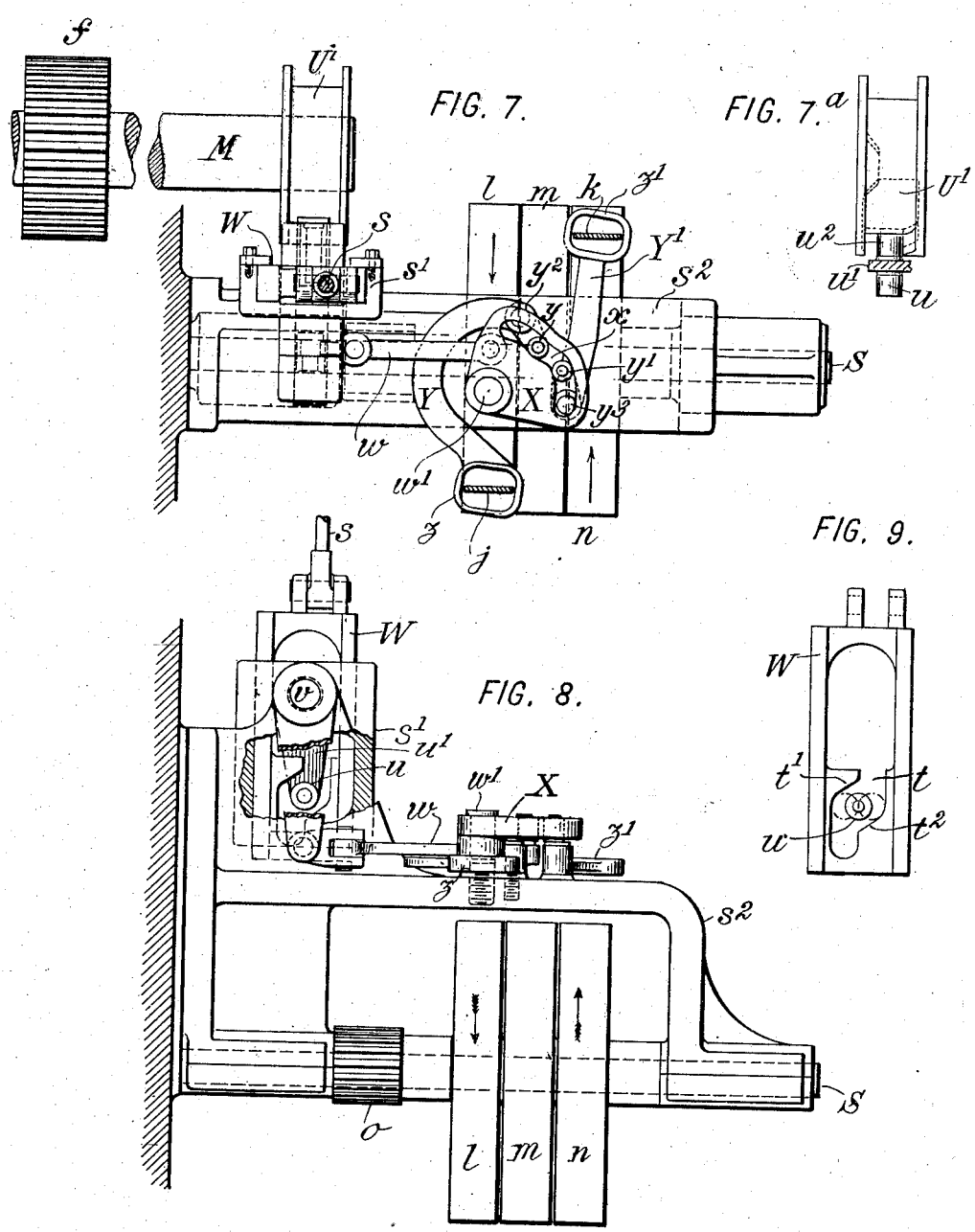

No. 738,459. PATENTED SEPT. 8, 1903.
F. M. LEAVITT.
DRAWING PRESS.
APPLICATION FILED JUNE 16, 1902.
NO MODEL.
9 SHEETS—SHEET 8.

Witnesses
Fred White
Thomas S Wallace

Inventor
Frank M. Leavitt
By his Attorneys
Arthur E. Draser

No. 738,459. PATENTED SEPT. 8, 1903.
F. M. LEAVITT.
DRAWING PRESS.
APPLICATION FILED JUNE 16, 1902.
NO MODEL. 9 SHEETS—SHEET 9.

No. 738,459. Patented September 8, 1903.

UNITED STATES PATENT OFFICE.

FRANK M. LEAVITT, OF BROOKLYN, NEW YORK, ASSIGNOR TO E. W. BLISS COMPANY, OF BROOKLYN, NEW YORK, A CORPORATION OF WEST VIRGINIA.

DRAWING-PRESS.

SPECIFICATION forming part of Letters Patent No. 738,459, dated September 8, 1903.

Application filed June 16, 1902. Serial No. 111,860. (No model.)

*To all whom it may concern:*

Be it known that I, FRANK M. LEAVITT, a citizen of the United States, residing in the borough of Brooklyn, county of Kings, city and State of New York, have invented certain new and useful Improvements in Drawing-Presses, of which the following is a specification.

This invention relates to drawing-presses for drawing sheet metal or metal plates into cup-shaped articles. Such presses require an annular blank-holder for pinching the rim portion of the blank with a suitably-graduated pressure and a punch or male die movable through the blank-holder for forcing the central portion of the blank into cup shape and drawing the metal between the blank-holding surfaces. Two types of such presses are commonly used—namely, first, the American type, where the bed or lower die is stationary and the blank-holder descends from above upon it, while the punch also descends from above through the blank-holder and through the female die, and, second, the German type, where the blank-holder is stationary and the female die is mounted upon a bed or platen which moves up from beneath to clamp the blank against the blank-holder, while the punch comes down from above through the blank-holder and into the female die to draw the blank.

The American type of press is commonly a compound toggle-press—that is to say, the blank-holder is operated through toggles whereby to give it the required dwell during the drawing operation instead of imparting to it its somewhat irregular motion by means of cams or by means of toggles operated by cams. The disadvantage of the American type of press is that it requires that the punch shall have a stroke exceeding twice the depth of the draw. This for shallow drawing is no serious disadvantage; but for deep drawing it makes the press very unwieldy and results in considerable waste of time, especially in a press which is designed for continuous running wherein the stroke of the punch must be prolonged to give time for inserting the work, this prolongation being still further increased it a redrawing-press. Further, as the punch enters the work when the crank operating it is about mid-stroke the punch is then moving at its maximum speed and strikes an objectionable blow, and as it is practically requisite that the punch enter at slow speed it is necessary to slow down the entire press. These disadvantages are largely remedied in the German type of press, wherein the movable bed has a stroke but slightly exceeding the depth of draw and the punch has a stroke only about one-third greater than the depth of draw. In this type of press the punch enters the work shortly after passing its upper dead-center, and hence long before it reaches its maximum speed, so that the press can be speeded much faster than the American type without undue shock. Another advantage of the German type of press for continuous running is that the operator feeds the work while the punch is ascending, so that he is free from any confusion and feels confidence in feeding deliberately during the entire time that the punch is moving up and until it commences to move down, whereas with the American type of press the punch is descending during the time provided for feeding in the work, a movement which inevitably confuses and frightens the operator. The German type of press, however, has been defective in that its blank-holding surfaces have been operated by cams either directly or through the medium of toggles, so that the operation of the press is impaired by wear of the cams and is rendered defective by an undesirable disposition of the strains. The necessary employment of a continuously-moving punch and an intermittently-moving bed or blank-holding part (which latter should preferably in each revolution ascend during about sixty degrees, then dwell while holding the blank for one hundred and twenty degrees, then descend during sixty degrees, and again dwell in its lowest position for one hundred and twenty degrees to give time for feeding on a new blank) has involved a serious mechanical problem in all but comparatively small presses. Attempts have been made to solve this problem for large presses by resorting to hydraulic rams to operate the punch and bed; but this has not fully met the requirements of practice and is only available for presses of very large size and is accompanied by the disadvantage of requiring a complicated series of hydraulic-pressure pumps and valves.

My invention provides an improved mode of operation whereby with a punch or male die moving continuously, or substantially so, the bed or blank-holding part is given the requisite intermittent movements with intervening prolonged dwells without mechanical complication and without resorting to cams.

According to my invention I provide any suitable means for imparting suitable motion (preferably continuous) to the punch, and I provide a more or less independent mechanism for imparting the intermittent rising-and-falling movements to the bed, this mechanism being thrown out of action at the end of each movement in order to establish the requisite dwell and being controlled or set in motion by the movements of the punch or the punch-driving mechanism.

In one embodiment of my invention the punch is caused to reciprocate vertically in a preferably continuous manner by being driven, preferably, from a crank or eccentric, although any other driving means for the punch is within my invention. The blank-holder or blank-holding clamp has its upper member attached to a stationary part of the frame, while its lower member is carried by a vertically-reciprocating bed or platen. This bed is caused to ascend to clamp the blank, then to dwell to hold the blank during the drawing operation, then to descend to release the blank and discharge the work, and then to dwell again to permit time to feed on a new blank. These movements of the bed are imparted by a driving mechanism which may be wholly independent of that which drives the punch or may take power from the same source of power, as preferred. The bed-driving mechanism is caused to act intermittently, so as to impart motion only during the time that the bed is ascending or descending. To this end it is controlled by the movement of the punch or punch-operating mechanism, preferably through the medium of any suitable cam or of suitable tappets. One practicable means of accomplishing this control is to introduce a belt-shifter controlling a straight and crossed belt, so as to throw the straight belt upon the driving-pulley of the bed-actuating mechanism for driving the bed in one direction and the crossed belt upon said pulley for driving the bed in the contrary direction, both belts being thrown onto loose pulleys during the periods of dwell. Such belt-driving mechanism is a well-understood expedient in mechanics for imparting either an intermittent movement or a movement first in one direction and then in the reverse direction and may be substituted by any equivalent mechanism in carrying my invention into practice.

Having now made the nature of my invention understood, I will proceed to describe one suitable embodiment thereof with reference to the accompanying drawings, wherein—

Figure 2:
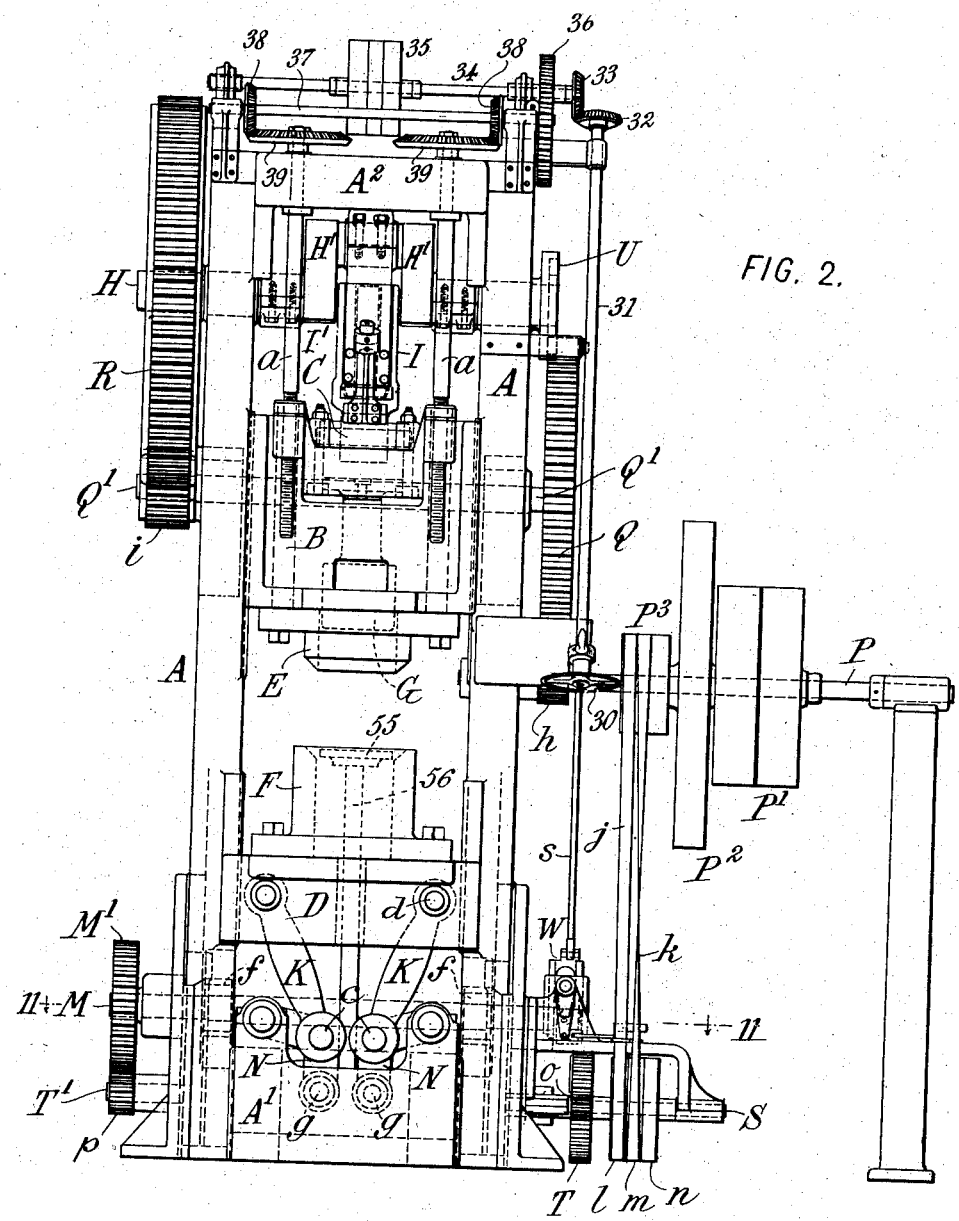
Figure 3:
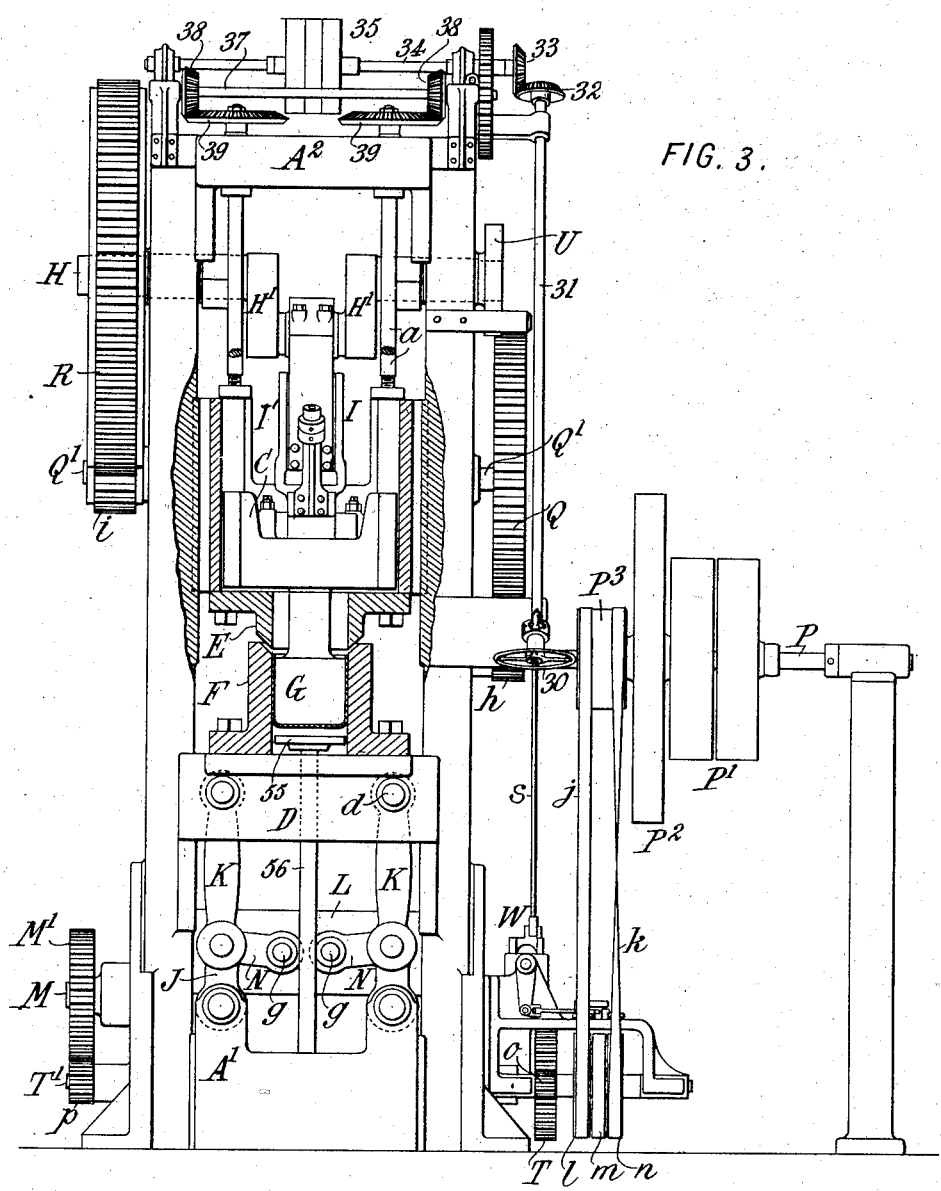
Figure 4:
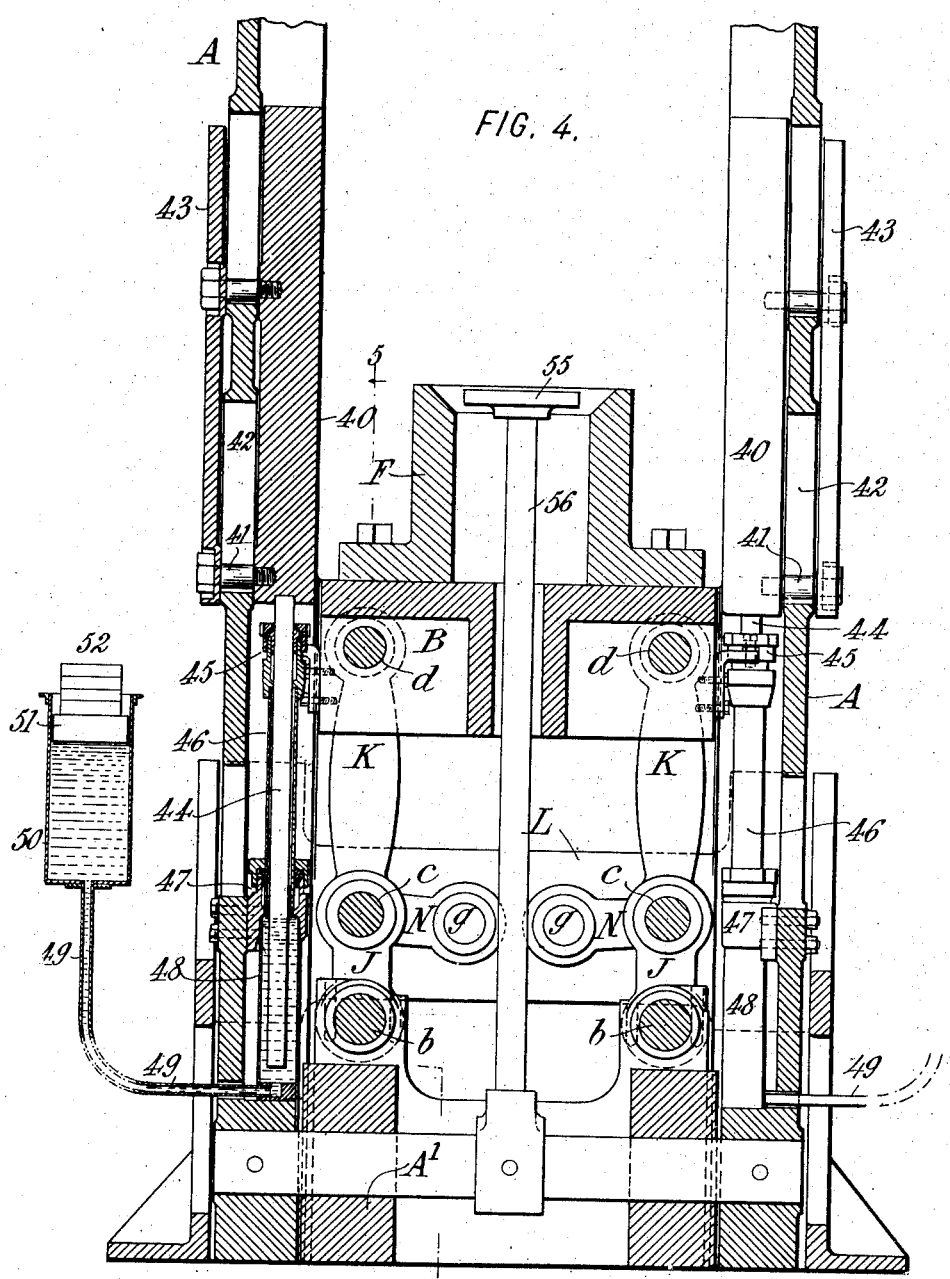
Figure 5:
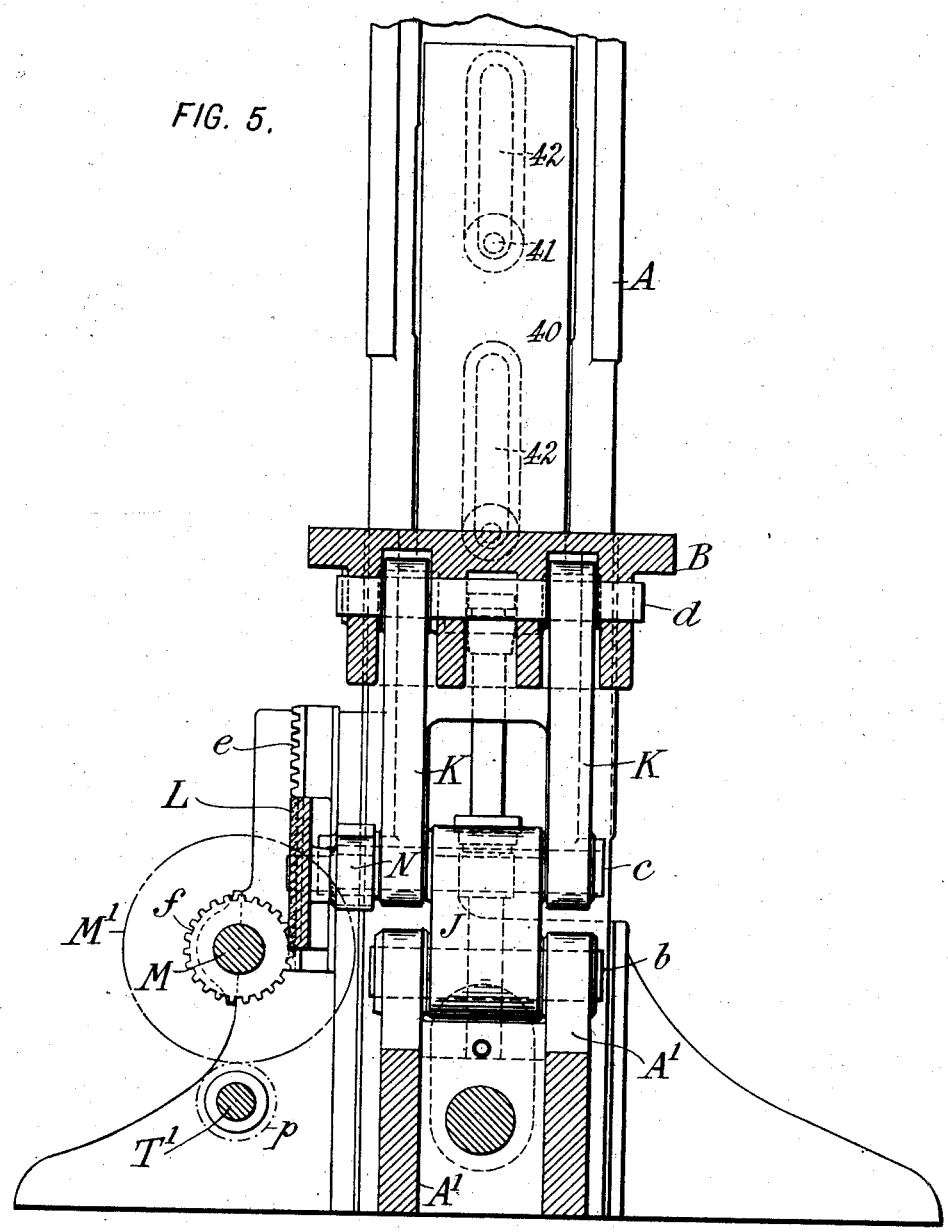
Figure 10:
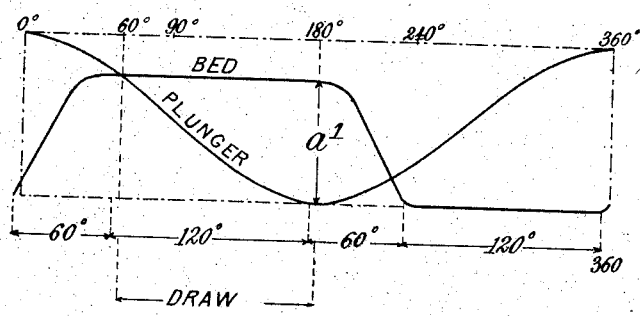
Figure 11:
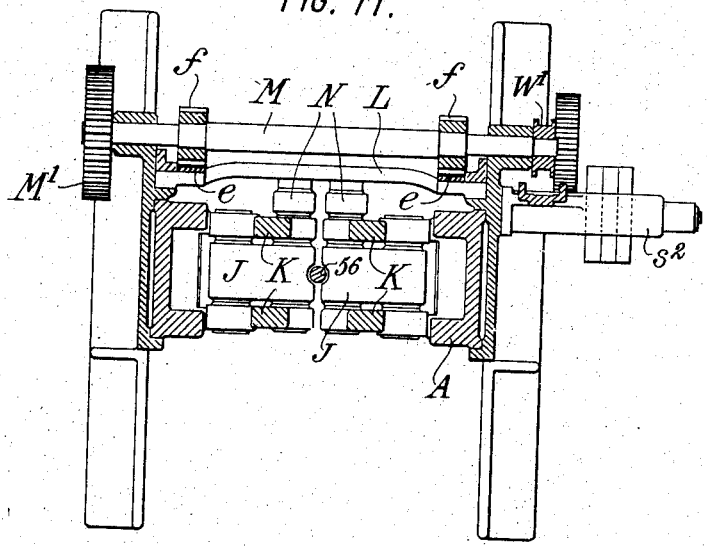
Figure 12:
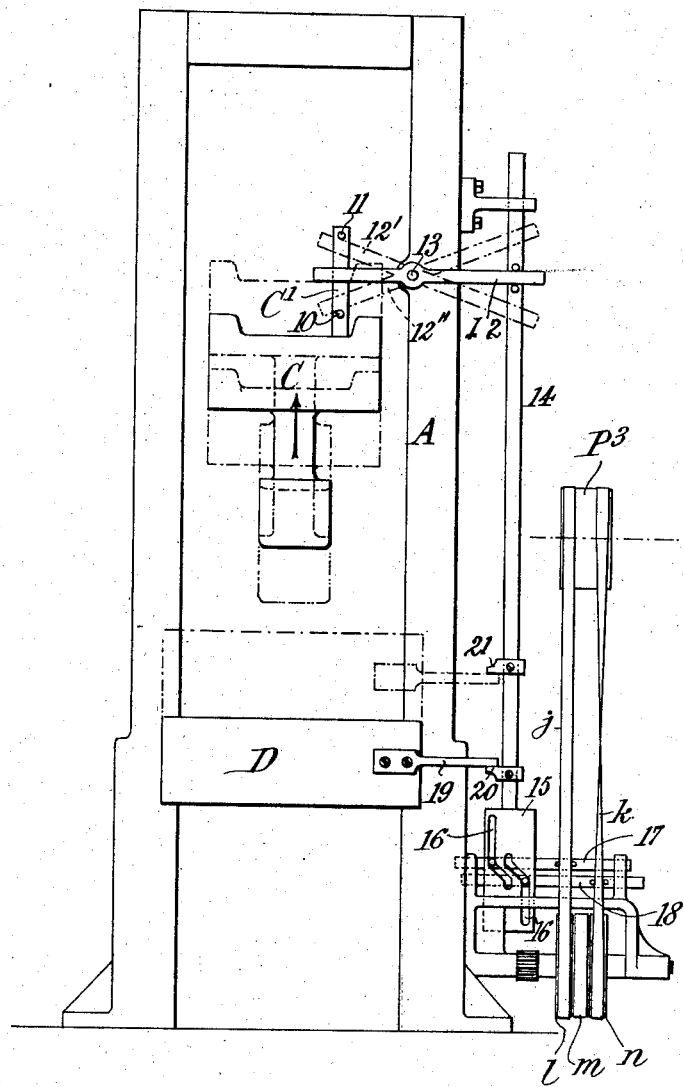

Figure 1 is a side elevation of a drawing-press constructed according to my invention. Fig. 2 is a front elevation thereof. Fig. 3 is a front view, partly in vertical mid-section, showing the press in operation at the termination of the drawing stroke. Fig. 4 is a sectional front view of the lower part of the press on a larger scale, showing the bed up. Fig. 5 is a side view in vertical transverse section on the line 5 5 in Fig. 4. Fig. 6 is a side elevation showing the means for controlling the bed-operating mechanism, being a view corresponding to Fig. 1, but on a larger scale, and showing this mechanism isolated and in greater detail. Figs. $6^a$ and $7^a$ are detail views of the cam $U'$ and roller $u^2$. Fig. 7 is a plan of the same mechanism in horizontal section on the line 7 7 in Fig. 6. Fig. 8 is a front elevation of the mechanism shown in Fig. 7 corresponding to a fragment of Fig. 2. Fig. 9 is a detail of the cam-slide W. Fig. 10 is a diagram showing the relative movements of the bed and plunger. Fig. 11 is a horizontal section cut approximately on the line 11 11 in Fig. 2. Fig. 12 is a diagrammatic front elevation illustrating a modification.

Referring first to Figs. 1, 2, and 3, let A designate any suitable main frame, preferably upright, and consisting in the construction shown of two upright side frames connected by fixed cross-pieces $A'$ at the base and $A^2$ at the top with an intermediate cross piece or head B, which is normally stationary, but is vertically adjustable by means of threaded portions engaged by the threads on bolts $a\ a$, connecting it to the cross-piece $A^2$. A vertically-movable slide or plunger C is mounted to move through the open or hollow central portion of the cross-head B. A lower cross-piece D, constituting a movable bed or platen, is mounted to move vertically between the vertical side frames. The cross-pieces B and D carry, respectively, the clamping members, which together constitute the blank-holder, (which expression I shall hereinafter use to indicate collectively these two members which between them clamp and hold the blank.) The upper blank-holding member E is fastened to and beneath the cross-piece B, while the lower blank-holding member F is fastened on top of the movable bed D. The upper one being stationary, the lower one rises and falls with the movements of the bed D to clamp or release the blank. The male die or punch G is fastened beneath the plunger C and works through the blank-holding members E F, the latter of which constitutes, as usual, the female die.

The vertically-reciprocating plunger C, with its punch G, may be moved by any mechanism known in the art or applicable to this purpose, being shown as operated by a crank $H'$ on a shaft H, the plunger being connected to the crank by a suitable connecting rod or pitman I, which is provided with the usual adjusting means I', as best seen in Figs. 2 and 3. This imparts a regular rising-and-falling motion to the punch.

The bed D may be caused to ascend or descend by any known or suitable mechanism, toggle-joints being preferable. In the construction shown toggle arms or links J J, Figs. 4 and 5, are jointed by cross-shafts $b\ b$ to the cross-piece A' of the frame and jointed by shafts $c$ to toggle arms or links K K, arranged, preferably, in pairs, and which are connected at their upper ends to the bed D by means of cross-shafts $d\ d$. Power is applied to the pivot-shafts or knuckle-joints $c\ c$ to straighten the toggles in order thereby to lift the bed. For this purpose a vertically-moving slide L is provided, carrying on its opposite ends racks $e\ e$, which mesh with toothed pinions $f\ f$ on a horizontal shaft M, so that as this shaft is turned in one direction or the other this slide L is caused to ascend or descend. The slide L is connected to the knuckle-joints or shafts $c\ c$ by means of connecting-links N N, each of which at one end engages one of the shafts $c$ and at the other engages a stud $g$ on the slide L. As the slide L is raised to carry the studs $g\ g$ from the positions shown in Fig. 2 to those shown in Figs. 3 and 4 the upward thrust communicated through the links N N swings the shafts $c\ c$ around the shafts $b\ b$ in a circular arc, and thereby straightens the toggles J K, the thrust communicated through the links N N becoming an outward thrust as the final position shown in Fig. 4 is approached. The slide L in ascending stops in such position as leaves the toggles extended with the arms J K in alinement; but it is not essential that it stop accurately in exactly a uniform position, since at the instant that the toggles are in line and the link N is perpendicular thereto its mechanical advantage is infinitely great, and any slight departure from this theoretically exact position causes so slight displacement of the bed B as to be practically negligible.

With the machine thus far described it is only necessary to provide means for continuously driving the shaft H and for intermittently driving the shaft M first forward and then backward at proper intervals in order to cause the bed B to rise and fall at proper times with relation to the movements of the punch. In the apparatus shown the entire press is driven from a shaft P, to which power may be applied by a belt on one of the pulleys P' as usual, a fly-wheel $P^2$ being preferably provided. The shaft P carries a pinion $h$, which meshes with and drives a large gear-wheel Q, fixed on a shaft Q', on which is fixed a pinion $i$, which meshes with and drives a large gear R, fixed on the shaft H. The pitch-lines of the several gears are indicated in Fig. 1. Thus a comparatively slow revolution is imparted to the shaft H, which is driven continuously in one direction. From the shaft P power is taken by a pulley $P^3$ and two belts (a direct belt $j$ and a crossed belt $k$) to pulleys $l$, $m$, or $n$ on a reverse-motion shaft S. The pulleys $l$ and $n$ are loose pulleys, and $m$ is fast to the shaft S, so that when the belt $j$ is shifted onto this fast pulley it drives the shaft S in one direction, while when the crossed belt $k$ is shifted onto this fast pulley it drives the shaft S in the contrary direction. The shaft S is connected by suitable gearing to the shaft M, as by means of a pinion $o$, fixed on the shaft S, meshing with and driving a gear-wheel T on a shaft T', on which is fixed a pinion $p$, which meshes with and drives a gear-wheel M' on the shaft M. Hence it is only necessary to provide means for shifting the belts $j\ k$ at suitable times onto and off from the fast pulley $m$ in order through the intermediate gearing to drive the shaft M and raise or lower the slide L. These operations might be performed by any ordinary belt-shifting mechanism operated by hand; but as greater certainty and rapidity are desirable I have provided a belt-shifting mechanism which in general is of a known type and which is operated with mechanical precision by suitable connection with any part which imparts or participates in the movements of the punch or its carrying slide or plunger C and the bed D. This is preferably accomplished by means of suitable actuating parts carried by the shafts H and M. In the construction shown I have applied a disk cam U to the shaft H, which cam has a groove with opposite tappets or projections $q\ q'$, adapted to act oppositely on a roller $r$, carried on a lever V, which is fulcrumed at $r'$ to the frame and connected at its opposite free end $r^2$ by a connecting-rod $s$ to a vertically-movable starting cam or slide W, which is shown as having bearings or slideways $s'$ in the frame $s^2$, which carries the reverse-shaft S. For greater clearness the slide W is shown separately in Fig. 9. This slide has an angular groove $t$, formed by opposite inclines $t'\ t^2$. Into the groove projects a stud or roller $u$, carried on a pendent arm $u'$, fixed on a rock-shaft $v$, on which is fixed another pendent arm $v'$, the lower end of which connects, through a rod $w$, to an oscillating cam-plate or quadrant X, turning about a fixed stud $w'$ and having a cam-groove $x$. Into this groove project two rollers $y$ and $y'$, carried on the short arms of levers Y and Y', respectively, which levers are pivoted, respectively, on studs $y^2$ and $y^3$ and have at the ends of their long arms rings (or forks) $z$ and $z'$, respectively, which embrace the respective belts $j$ and $k$ for shifting them from their respective loose pulleys $l$ and $n$ onto the fast pulley $m$. This belt-shifting mechanism is in itself old and well known and requires no particular description. Suffice it to say that when the slide W is depressed by the action of the cam projection $q$ its incline $t'$, Fig. 9, acts on the roller $u$ to throw it from the position shown in full lines in Fig. 9 toward the right, whereby through the interconnecting parts the cam-plate X is oscillated so that its cam-groove $x$ displaces the roller $y'$ and lever $Y'$ in such manner as to throw the belt $k$ from the loose pulley $n$ to the fixed pulley $m$, thereby driving the latter in such direction as to raise the bed D. After a suitable interval, determined by the cam U, and within the time required to raise the bed D the slide W is lifted back to its previous position, (see Fig. 9,) but without moving the roller $u$. The ascent of the bed continues until at near the top of its stroke a stopping-cam $U'$ on the shaft M acts upon a roller $u^2$, carried on arm $u'$ in line with roller $u$, to push it back to its mid-position, which movement is communicated through the intervening parts to the lever Y, which throws the belt $k$ off from the fast pulley $m$ and onto the loose pulley $n$, thereby stopping the bed-actuating mechanism and leaving the bed elevated. Subsequently when the projection $q'$ on the cam acts the cam-slide W is raised, so that its incline $t^2$ moves roller $u$ to the left, whereby motion is communicated to oscillate the plate X to the contrary extreme position, whereby its cam-groove $x$ acts upon the roller $y$ and swings the lever Y to carry the belt $j$ from the loose pulley $l$ onto the fast pulley $m$, whereby the bed-actuating mechanism is driven in the contrary direction, so that the bed D is caused to descend. During its descent the cam U restores the cam-slide W to its normal mid-position, and toward the end of the descent of the bed the cam $U'$ acts on roller $u^2$ to move it back to its mid-position, thereby again communicating motion to the cam-plate X, which throws the belt-shifter arm Y back to its normal position and carries the belt off from the fast and onto the loose pulley, thereby stopping the bed-driving mechanism and leaving the bed in its lowermost position. The stopping-cam $U'$ oscillates with the shaft M through less than a revolution to each movement of the bed (in practice through about two hundred and sixty degrees) and at each end of its movement acts to restore the roller $u^2$ (and with it roller $u$) to mid-position. A development of cam $U'$ is shown in Fig. 6$^a$, where 1 and 2 are the opposite cam-inclines and 3 4 5 6 the successive positions of roller $u^2$. The roller is moved from 3 to 4 by cam U and cam-slide W, whereupon the cam $U'$ is moved in such direction that the roller traverses its face in direction of the arrow 7, and on reaching incline 1 it is restored to mid-position and stops. When later it is moved from 5 to 6 by cam U and cam-slide W, the rotation of cam $U'$ causes the roller to move relatively to it along path 8 until incline 2 restores it and stops the movement.

The relative movements imparted to the bed, with its lower blank-holding member, and to the plunger, with its male die or punch, are indicated in the diagram Fig. 10. From this it will be seen that the bed commences to ascend just before the plunger commences to descend and completes its ascent before the plunger has descended far enough to bring the punch against the blank, so that the blank is pinched suitably in advance of the drawing operation. The bed remains elevated during the remaining descent of the plunger, and immediately after the latter has reached the bottom of its stroke and begins to ascend the bed commences to descend, which it does rapidly, and remains at rest in its lowest position during almost the entire remainder of the upstroke of the plunger to give time for removing the finished work and for feeding a new blank in place upon the die. The movements of the bed are comparatively rapid, the bed rising, preferably, during sixty degrees, remaining stationary to hold the blank during one hundred and twenty degrees, (which includes the period of the drawing operation denoted by the word "draw" and which continues for about one hundred and sixty degrees,) and then descends during sixty degrees and remains at rest during the remaining one hundred and twenty degrees. The proportions of speeds, however, are variable, according to circumstances. The depth of draw is indicated by the arrow $a'$, which, it will be observed, is about three-fourths the total stroke of the plunger, so that for a given depth of draw the press has the minimum stroke consistent with allowing the requisite clearance, and hence the vertical dimensions of the press are kept within the lowest practicable limits.

It will be understood from the foregoing description that the novel principle introduced by my invention resides in the provision of intermittently-acting mechanism for imparting the rising and falling movements to the movable bed or platen which carries the movable blank-holding member, this mechanism being disconnected from its source of power during the periods of rest of the movable bed. As these periods of rest aggregate about two-thirds of the total time and the periods of movement only about one-third thereof, this provision of an intermittently-acting mechanism avoids the otherwise necessary employment of means for moving the bed adapted to provide for these prolonged periods of rest and which heretofore have been in the form of cams. My invention enables all lost-motion provisions to be eliminated from the mechanism for lifting or lowering the bed and transferred to a control mechanism for determining the time of operation thereof. Thus instead of operating the toggles which move the bed from a cam or cams I may operate the control mechanism from a cam or cams—viz., the cams U and $U'$. These cams having but light work to do are not subject to excessive wear, and if wear should occur it would not ordinarily affect materially the operation of the bed-moving mechanism, and in case of undue wear the cams can be readily and cheaply replaced. However, my invention is by no means limited to the employment of cams as the means for operating the control mechanism, as tappets or other mechanical expedients may be substituted.

Fig. 12 shows in a somewhat diagrammatical manner one means whereby tappets may be applied to operate the control mechanism, which in this case also is a belt-shifter. The plunger C carries an upright C', having tappet projections 10 and 11 adapted to strike a tappet-lever 12, pivoted at 13 to the frame A, while its opposite arm engages between pins on a vertical rod or slide 14, carrying a cam-plate 15. This plate has cam-grooves 16, engaging pins or rollers on two belt-shifter slides 17 and 18, the former serving as the shifter for the belt $j$ and the latter for the belt $k$. The movable bed or platen D has a tappet-arm 19, which at its lowermost position strikes a stop projection 20 on the plate 15 and when in its uppermost position strikes a projection 21 thereon. In the diagram the plunger C is ascending, while the bed D is pausing in its lowermost position. When the plunger approaches the top of its stroke, its tappet-pin 10 strikes the lever 12 and throws it to the position 12', thereby moving down the rod 14 and plate 15, so that the angular cam-groove 16 moves the belt-shifter 18 to the left, and thereby shifts the belt $k$ onto the fast pulley $m$ and (acting through the same gearing and toggles as in the construction previously described) causes the bed to rise. When the bed reaches its uppermost position, its tappet 19 strikes the projection 21 and restores the plate 15 to its normal mid-position, the plunger C having by this time so far descended as to bring the pin 10 out of the way of the lever 12, so as not to obstruct the return movement of this lever to its normal mid-position. The return movement of the plate 15 restores the belt-shifter 18 and throws the belt $k$ back onto its loose pulley, thereby stopping the bed. When the plunger reaches nearly its bottom stroke, its pin 11 encounters the lever 12 and displaces it to the position shown in dotted lines at 12'', thereby lifting the plate 15, so that its cam-groove 16 displaces the belt-shifter 17 and throws the belt $j$ onto the fast pulley, whereupon the bed descends until on reaching the bottom end of its stroke the tappet-arm 19 moves down the plate 15 to its normal mid-position, and thereby restores the belt-shifter 17 and throws the belt $j$ again onto its loose pulleys, thereby stopping the bed. This tappet mechanism is illustrated merely as a suggestion of one of numerous tappet devices that may be applied in carrying my invention into practice.

In Figs. 1 and 2 of the drawings I have illustrated a means for vertically adjusting the upper blank-holding member, which, although forming no part of my invention, I will briefly describe. The sliding head or cross-piece B is engaged by four screws $a$ $a$, having thrust-bearings in the upper fixed head $A^2$ and which are geared together so as to be simultaneously turned from some suitable operating-handle, such as a wheel 30, at one side of the frame, fixed on a shaft 31, the upper end of which carries a bevel-gear 32, driving a similar gear 33 on a shaft 34, which shaft also carries fast and loose pulleys 35, by which through a suitable belt-shifter it may be driven by power instead of by hand through the wheel 30. This shaft 34 has a pinion meshing with two gears 36 36 on horizontal shafts 37 37, each of which is geared to two of the screw-shafts $a$ $a$ through bevel-gears 38 and 39. Thus the four screw-shafts are turned simultaneously and through their screw-threads, which are of equal pitch, act to raise or lower the sliding cross-head B. In a large and heavy press it is desirable because of the weight of the bed D to counterbalance this bed. To accomplish this, I provide a construction shown in Figs. 4 and 5. Within the hollow of the upright side pieces of the main frame A, I mount counterweights 40 40, which are suitably guided in any desired way, as by means of studs 41, working in vertical slots 42 in the side frames, an outer plate 43 being preferably applied to cover these slots. The counterweights 40 are connected to the bed D through hydraulic means. Beneath each counterweight 40 is applied a plunger 44, which passes down through a stuffing-box 45 in the top of a tubular plunger 46, which is fastened to the bed B and which in turn passes down through a stuffing-box 47 into a fixed hydraulic cylinder 48. The latter cylinder being filled with liquid (preferably oil) under pressure, this liquid presses upwardly on the plungers 44 with a pressure directly proportioned to the area of these plungers and also presses upwardly on the plungers 46 with a pressure directly proportioned to the difference between their area and that of the inner plungers 44. Assuming the counterweights 40 to weigh each half as much as the bed and assuming the area of the inner plungers 44 to be half that of the outer plungers 45, it is apparent that the counterweights, acting through the hydraulic column, will counterbalance the bed. As the bed descends its plungers 46, entering the cylinder 48, displace the liquid therein and force up the plungers 44, thereby lifting the counterweights. To maintain the hydraulic pressure and make provision for leakage and also to compensate for any want of exact proportion between the areas of the plungers and the weights to be carried, respectively, I provide a hydraulic accumulator in communication with the cylinders 48. The construction of such accumulators is well understood, and therefore I have not undertaken to show the same in any detail, but have illustrated an extremely simple form of accumulator comprising a cylinder 50, connected by a pipe 49 with the respective cylinders 48 and having a piston 51, to which are applied weights 52 for imparting the requisite pressure to the liquid. Sufficient pressure should be applied to the liquid by means of the accumulator to exactly counterbalance the weights 40. The counterbalancing means thus set forth is extremely compact and is free from the complication and liability to breakage incident to the use of mechanically-connected counterweights.

In order to expel the drawn blank from the female die F, I may provide the usual push-out pad or knocker 55, Figs. 2 and 3, supported on a post 56, which is fastened at its lower end to the base and which passes freely through a hole in the bed D, so that as the bed descends the blank is stopped against this pad and is thereby pushed out of the die.

It is within my invention to drive the movable bed or platen operating mechanism from any suitable source of power, which may be entirely distinct from that by which the plunger is operated. For example, I may apply a steam-engine or electromotor or other source of power to operate the plunger, and I may apply a distinct steam-engine, electromotor, &c., to operate the bed, in which case the former motor may run continuously so long as the press is in operation, while the latter may be started and stopped for each rising or falling movement of the bed. Such a press, operated by independent engines, I claim specifically in an application filed by me June 16, 1902, Serial No. 111,859.

My invention is not necessarily limited to a drawing-press of the German type, or one in which the upper blank-holding member is stationary and the lower one is mounted on a rising-and-falling bed, since it is applicable, although with less advantage, to presses of the American type, where the lower blank-holding member is fixedly mounted and the upper member is carried by a moving part. As applied to the latter class of presses the moving part carrying such upper member becomes the equivalent of the movable bed of the press herein described.

What I claim is—

1. In a drawing-press, the combination with means for reciprocating the punch, of independently-driven mechanism for raising and lowering the movable bed, and means in connection with the punch-reciprocating means for controlling such mechanism to cause the bed to be raised and lowered at prescribed points in the travel of the punch.

2. In a drawing-press, the combination with means for reciprocating the punch, of independently-driven reversible mechanism for operating the movable bed, and controlling means in connection with the punch-reciprocating means for starting, stopping and reversing such mechanism to cause it to operate at intervals to raise and lower the bed at prescribed points in the travel of the punch.

3. In a drawing-press, the combination with means for reciprocating the punch, of independently-driven mechanism for raising the bed, and means in connection with the punch-reciprocating means for controlling such mechanism to start the same at a prescribed point in the travel of the punch.

4. In a drawing-press, the combination with means for reciprocating the punch, of independently-driven mechanism for raising and lowering the movable bed, and means operated by the punch-reciprocating means for controlling such mechanism to start the same at prescribed points in the travel of the punch.

5. In a drawing-press, the combination with means for reciprocating the punch, of independently-driven toggle mechanism for raising and lowering the movable bed, comprising toggle-links, a reciprocating slide for operating them, reversible driving mechanism for moving said slide, and means for controlling such driving mechanism to cause it to operate at intervals to raise and lower the bed at prescribed points in the travel of the punch.

6. In a drawing-press, the combination with means for reciprocating the punch, of independent mechanism for raising and lowering the movable bed comprising toggle-links J K, a reciprocating slide L connected to operate said toggle-links, a rack-and-pinion movement for reciprocating said slide, reversible mechanism for driving the same, and means for controlling such mechanism to cause the bed to be raised and lowered at prescribed points in the travel of the punch.

7. In a drawing-press, the combination with means for reciprocating the punch, of independent mechanism for raising and lowering the movable bed comprising toggle-links J K, a reciprocating slide L, links N N connecting said slide to said toggle-links, and adapted when the toggles are straightened to stand approximately perpendicular thereto, whereby to minimize the effect of varying stopping positions of the slide upon the elevation of the bed, reversible driving mechanism for reciprocating said slide, and means for controlling such mechanism to cause the bed to be raised and lowered at prescribed points in the travel of the punch.

8. In a drawing-press, the combination with means for reciprocating the punch, and a cam driven by said means, of mechanism for raising and lowering the movable bed driven independently of said cam and said punch-reciprocating means, and means for controlling such mechanism operated by said cam.

9. In a drawing-press, the combination with means for reciprocating the punch, of a mechanical device for raising the bed driven independently of said punch-reciprocating means, and means for starting and stopping such bed-actuating device at prescribed points in the travel of the punch, adapted to cause the bed to move to its active position and remain at rest therein during the draw, and then to move to its inactive position and remain at rest for the adjustment of a fresh blank.

10. In a drawing-press, the combination with means for reciprocating the punch, of independent mechanism for raising and lowering the movable bed, a belt-shifter for starting and stopping said mechanism, and means for operating said belt-shifter to start said mechanism at prescribed points in the travel of the punch.

11. In a drawing-press, the combination with means for reciprocating the punch, of independent mechanism for raising and lowering the movable bed, a belt-shifter for starting and stopping said mechanism, and means for operating said belt-shifter to start said mechanism at prescribed points in the travel of the punch, and to stop said mechanism at the end of the travel of the bed.

12. In a drawing-press, the combination with means for reciprocating the punch, of independently-driven reversible mechanism for raising and lowering the movable bed, a belt-shifter for starting, stopping and reversing such mechanism, and means for operating such belt-shifter at prescribed points in the travel of the punch and bed.

13. In a drawing-press, having a rising and falling bed, means for counterpoising said bed comprising a counterweight, and a hydraulic connection between the bed and counterweight, whereby the descent of the bed forces up the counterweight.

14. In a drawing-press having a rising and falling bed, means for counterpoising said bed comprising a counterweight, and a hydraulic connection between the bed and counterweight comprising a stationary cylinder, a plunger attached to the bed and entering said cylinder, and a plunger attached to the counterweight and entering said cylinder.

15. In a drawing-press having a rising and falling bed, means for counterpoising said bed comprising a counterweight, and a hydraulic connection between the bed and counterweight comprising a stationary cylinder, a tubular plunger attached to the bed and entering said cylinder, and a plunger attached to the counterweight and entering said cylinder through said tubular plunger.

16. In a drawing-press, having a rising and falling bed, means for counterpoising said bed comprising a counterweight, and a hydraulic connection between the bed and counterweight comprising a stationary cylinder, a plunger attached to the bed and entering said cylinder, a plunger attached to the counterweight and entering said cylinder, and an accumulator connected to said cylinder.

17. In a drawing-press having a rising and falling bed working between upright side frames, of means for counterpoising said bed comprising two counterweights movable adjacent to the respective side frames, and a hydraulic connection between the bed and said counterweights comprising stationary cylinders beneath said counterweights, plungers attached to the bed and entering said cylinders, and plungers attached to the respective counterweights and entering said cylinders.

In witness whereof I have hereunto signed my name in the presence of two subscribing witnesses.

FRANK M. LEAVITT.

Witnesses:
THOMAS F. WALLACE,
FRED WHITE.